US012682417B2

(12) United States Patent
Mcgrath et al.

(10) Patent No.: US 12,682,417 B2
(45) Date of Patent: Jul. 14, 2026

(54) PROXEMIC MANAGEMENT IN VIRTUALIZED ENVIRONMENTS

(71) Applicant: INTERNATIONAL BUSINESS MACHINES CORPORATION, Armonk, NY (US)

(72) Inventors: Meghan Mcgrath, Highland, NY (US); Al Chakra, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 18/534,175

(22) Filed: Dec. 8, 2023

(65) Prior Publication Data

US 2025/0191115 A1 Jun. 12, 2025

(51) Int. Cl.
*G06T 3/40* (2024.01)
(52) U.S. Cl.
CPC ...................................... *G06T 3/40* (2013.01)
(58) Field of Classification Search
None
See application file for complete search history.

(56) References Cited

U.S. PATENT DOCUMENTS

| | | | |
|---|---|---|---|
| 10,237,310 B2 | 3/2019 | Hayano et al. | |
| 10,438,419 B2 | 10/2019 | Kinstner et al. | |
| 10,627,983 B2 | 4/2020 | Bates et al. | |
| 10,722,800 B2 | 7/2020 | Tilton et al. | |
| 10,957,109 B2 | 3/2021 | Bender et al. | |
| 11,071,515 B2 | 7/2021 | Samec et al. | |

| | | | |
|---|---|---|---|
| 11,119,568 B2 | 9/2021 | Bodolec et al. | |
| 11,138,780 B2 | 10/2021 | Lee | |
| 11,444,982 B1 | 9/2022 | Slotznick | |

(Continued)

FOREIGN PATENT DOCUMENTS

| | | |
|---|---|---|
| BR | 12118770 A2 | 2/2022 |
| CN | 115177208 A | 10/2022 |

(Continued)

OTHER PUBLICATIONS

Tiger F. Ji, et al.; "VRBubble: Enhancing Peripheral Awareness of Avatars for People with Visual Impairments in Social Virtual Reality;" Oct. 22, 2022; In Proceedings of the 24th International ACM SIGACCESS Conference on Computers and Accessibility (ASSETS '22); pp. 1-17 (Year: 2022).*

(Continued)

*Primary Examiner* — Peter Hoang
(74) *Attorney, Agent, or Firm* — Lily Neff

(57) ABSTRACT

Computer-implemented defined proxemics to manage interpersonal encounters between users in virtual reality (VR) environments. A VR environment is initiated having a VR space in which a user, represented by an avatar, socializes amongst other users respectively represented as other avatars within the VR space. An impenetrable space barrier, having a size defined by predefined criteria, is created to enclose the avatar during movement within the VR space. The size of the impenetrable space barrier, with respect to an allowed interpersonal proximity between the avatar and each specific avatar of the other avatars, is dynamically adjusted during the movement within the VR space according to the predefined criteria and extrapolated data associated with the avatar and the other avatars.

17 Claims, 7 Drawing Sheets

(56) References Cited

U.S. PATENT DOCUMENTS

| | | |
|---|---|---|
| 2009/0138402 A1 | 5/2009 | Chan et al. |
| 2015/0126276 A1 | 5/2015 | Bhogal et al. |
| 2019/0139321 A1 | 5/2019 | Kicharlakota et al. |
| 2021/0339143 A1 | 11/2021 | Bar-Zeev et al. |
| 2022/0156653 A1 | 5/2022 | Abelow |
| 2022/0252881 A1 | 8/2022 | Wieczorek |
| 2022/0253125 A1 | 8/2022 | Wallen et al. |
| 2023/0163987 A1* | 5/2023 | Young .................... G06T 19/00 |
| | | 345/419 |

FOREIGN PATENT DOCUMENTS

| | | |
|---|---|---|
| EP | 3941340 A1 | 1/2022 |
| EP | 4034969 A1 | 8/2022 |
| WO | 2018082460 A1 | 5/2018 |
| WO | 2019133792 A1 | 7/2019 |

OTHER PUBLICATIONS

Simonite, Tom, "The War on the Disturbingly Real Trolls in Virtual Reality", MIT Technology Review, Mar. 13, 2017, https://www.technologyreview.com/2017/03/13/243303/the-war-on-the-disturbingly-real-trolls-in-virtual-reality/.
Wikipedia, "Proxemics", https://en.wikipedia.org/wiki/Proxemics, cited on Dec. 8, 2023.

* cited by examiner

100

300
310
USER WITHOUT SPACE BARRIER TALKING WITH TWO OTHER PLATFORM USERS
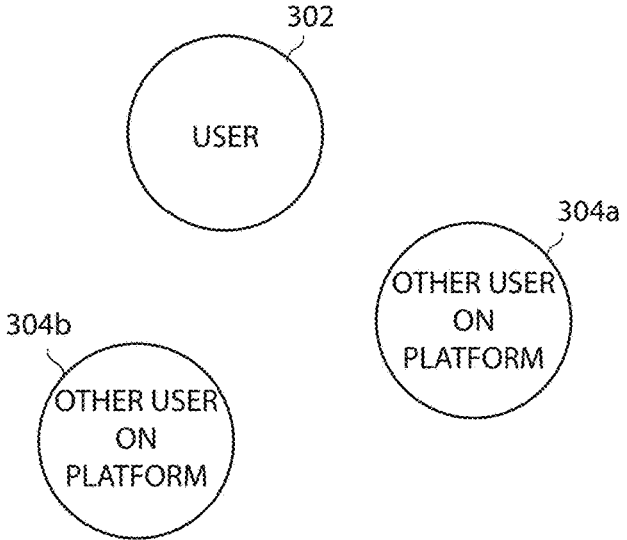
320
GRIEFER APPEARS UNEXPECTEDLY AND QUITE CLOSE WITHIN PERSONAL SPACE
OF USERES, PROMPTING PHYSIOLOGICAL REACTION IN REAL-TIME
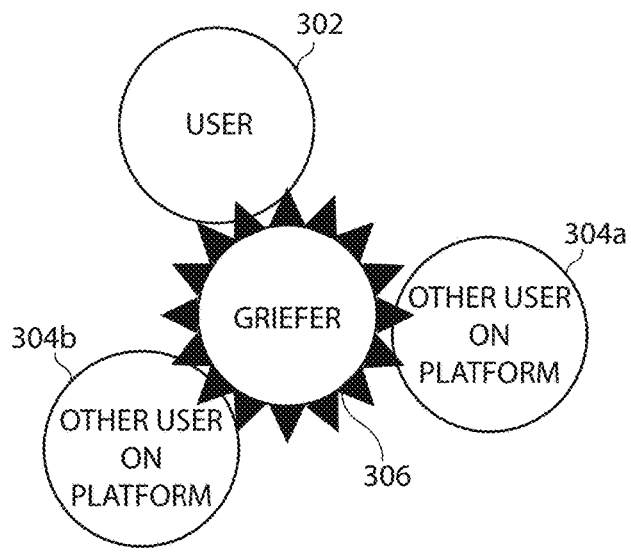
FIG. 3

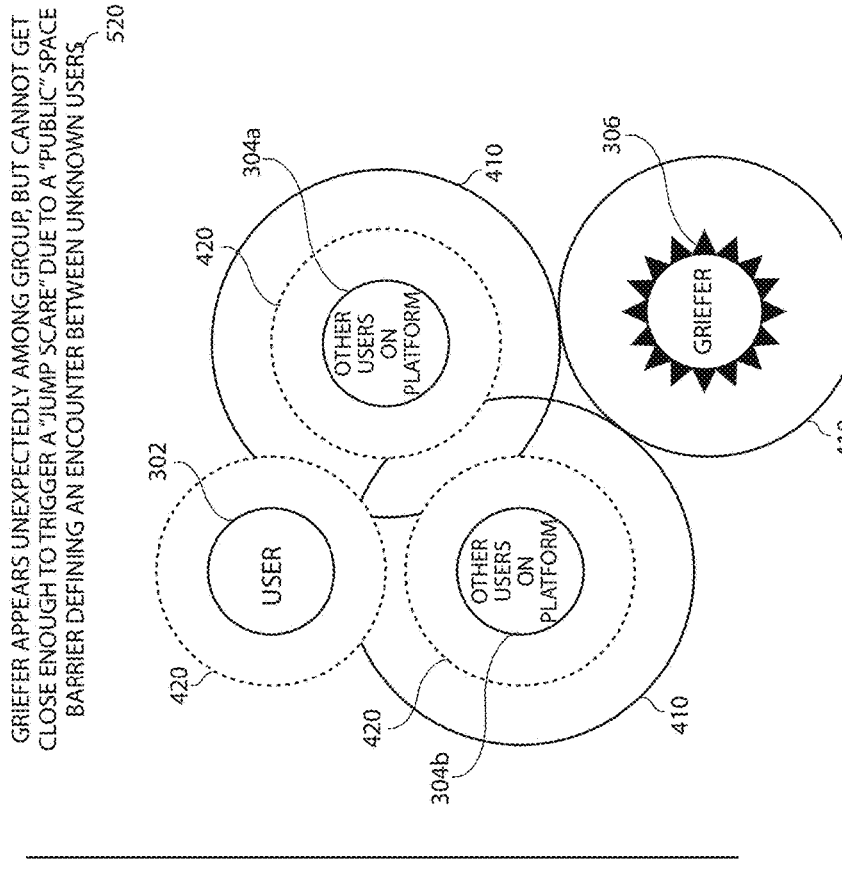
GRIEFER APPEARS UNEXPECTEDLY AMONG GROUP, BUT CANNOT GET CLOSE ENOUGH TO TRIGGER A "JUMP SCARE" DUE TO A "PUBLIC" SPACE BARRIER DEFINING AN ENCOUNTER BETWEEN UNKNOWN USERS
520
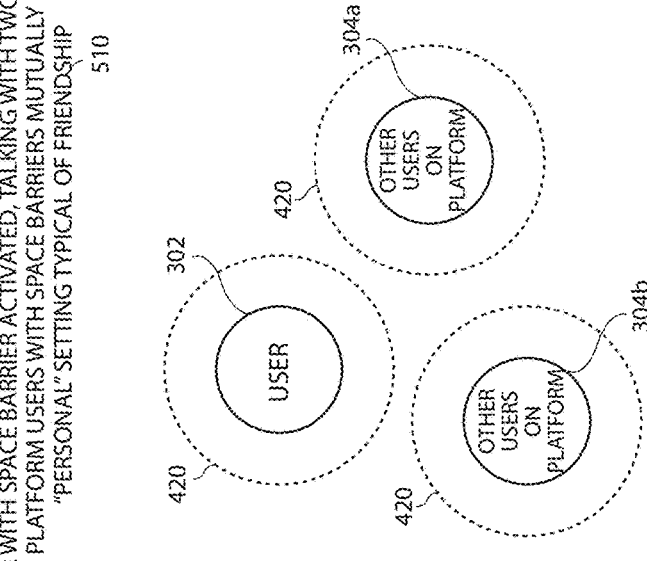
USER WITH SPACE BARRIER ACTIVATED, TALKING WITH TWO OTHER PLATFORM USERS WITH SPACE BARRIERS MUTUALLY AT "PERSONAL" SETTING TYPICAL OF FRIENDSHIP
510
500
FIG. 5

600

INITIAL MEETING
FAMILIARITY SET AT 0-3
(OR WHATEVER RANGE IS PRE-
DETERMINED BY PLATFORM)
SPACE BARRIER = PUBLIC

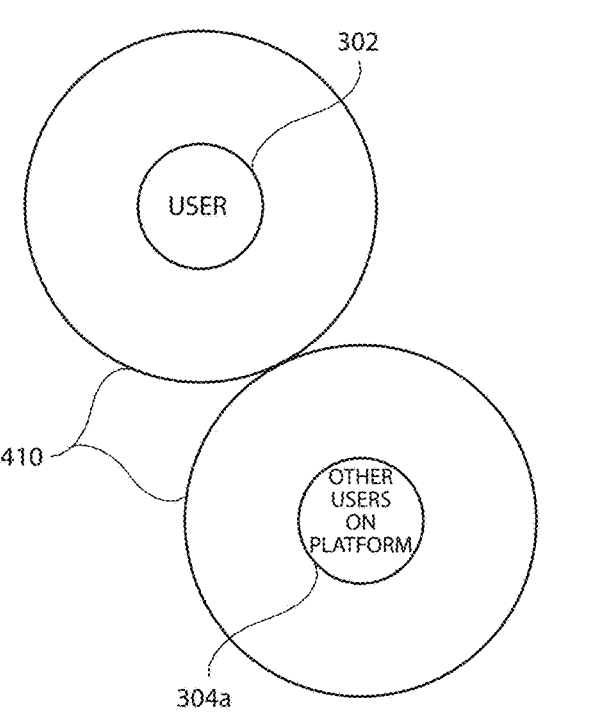

302

USER

410

OTHER
USERS
ON
PLATFORM

304a

SUBSEQUENT MEETINGS
FAMILIARITY SET AT 3-9
(OR WHATEVER RANGE IS PRE-
DETERMINED BY PLATFORM)
SPACE BARRIER = SOCIAL

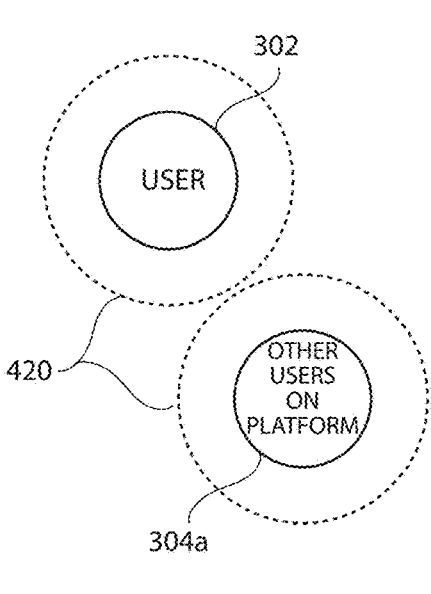

302

USER

420

OTHER
USERS
ON
PLATFORM

304a

SUBSEQUENT MEETINGS
FAMILIARITY SET AT 10
(OR WHATEVER RANGE IS PRE-
DETERMINED BY PLATFORM)
SPACE BARRIER = PERSONAL

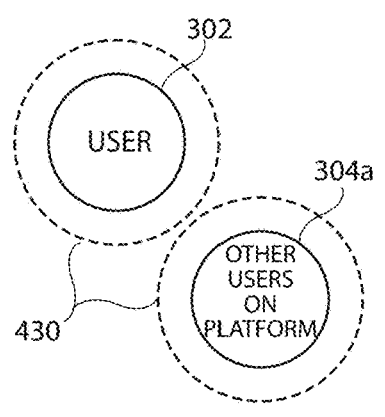

302

USER

304a

430

OTHER
USERS
ON
PLATFORM

SUBSEQUENT MEETINGS
FAMILIARITY SET AT 50
(OR WHATEVER RANGE IS PRE-
DETERMINED BY PLATFORM)
SPACE BARRIER = INTIMATE

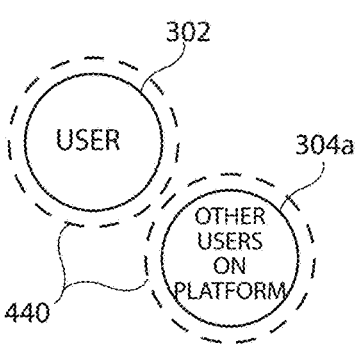

302

USER

304a

440

OTHER
USERS
ON
PLATFORM

PROXEMIC MANAGEMENT IN VIRTUALIZED ENVIRONMENTS

BACKGROUND OF THE INVENTION

Embodiments of the invention generally relate to computing systems, and more particularly, to the management of interpersonal space between users of a virtualized environments utilizing defined proxemics.

SUMMARY OF THE INVENTION

According to an embodiment, a computer-implemented method for using defined proxemics to manage interpersonal encounters between users in virtual reality (VR) environments is disclosed. A VR environment is initiated having a VR space in which a user, represented by an avatar, socializes amongst other users respectively represented as other avatars within the VR space. An impenetrable space barrier, having a size defined by predefined criteria, is created to enclose the avatar during movement within the VR space. The size of the impenetrable space barrier, with respect to an allowed interpersonal proximity between the avatar and each specific avatar of the other avatars, is dynamically adjusted during the movement within the VR space according to the predefined criteria and extrapolated data associated with the avatar and the other avatars.

An embodiment includes a computer usable program product. The computer usable program product includes a computer-readable storage device, and program instructions stored on the storage device executable to perform similar functionality.

An embodiment includes a computer system. The computer system includes a processor, a computer-readable memory, and a computer-readable storage device, and program instructions stored on the storage device for execution by the processor via the memory to perform similar functionality.

BRIEF DESCRIPTION OF THE SEVERAL VIEWS OF THE DRAWINGS

FIG. 3 is a schematic view of users represented in a virtual reality (VR) space.

FIGS. 5-6 are schematic views depicting use of defined proxemics and extrapolated data to manage interpersonal space between users of a VR space.

DETAILED DESCRIPTION OF THE INVENTION

Figure 1:
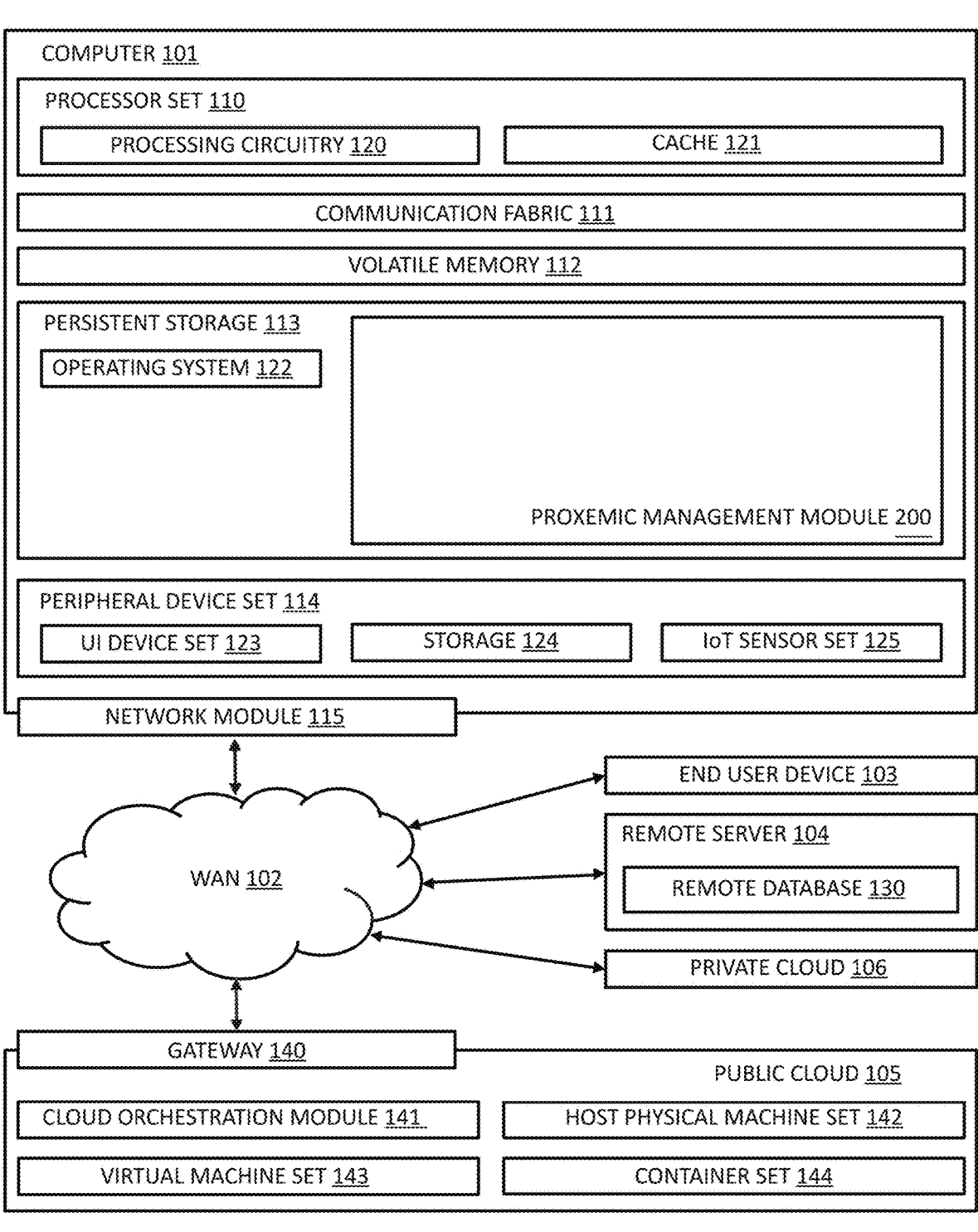
FIG. 1 is a block diagram depicting a computing device in which operations of the description may be performed.

Social environments in virtual reality (VR) applications are entering a period of growth. For example, VR gaming applications are being iteratively more widely used by persons of all ages, as advancements in VR technology increasingly provide a more realistic experience to users while decreasingly necessitating bulky nor expensive equipment to participate. In such VR spaces (and similar to most games/platforms), users are often represented as an avatar, and fellow users are likewise represented as other avatars. whom move amongst one another to socialize or perform some mission/task related to the game. These avatars may extend to additional VR applications, such as social and/or work applications the users engage in as part of ever-growing VR spaces.

As a consequence of various VR applications being able to be utilized by more users, disadvantages arise in the form of some users who seek to use such applications maliciously, antagonistically or frivolously, which lessens the overall experience of other users attempting to use the applications as intended. For example, in a practice known as "griefing" (e.g., in gaming applications), those users termed "griefers" antagonize fellow users in VR spaces, often attempting to "jump scare" individuals into a physiological fight-or-flight response by suddenly appearing in the users' personal space. In other words, individual users/players (griefers) direct their avatar to abruptly enter the personal space of other avatars in the VR space to antagonize the individual represented by the avatar. Griefers may also attempt to restrict, impede, or otherwise frustrate the users from resuming normal movement or gameplay in the VR space by hovering over their avatar in a manner that inhibits their ability to maneuver.

Users and developers of VR applications are aware of this practice, as reviews for some VR applications, and particularly gaming applications, are replete with warnings that use of the application may be impossible due to such "trolling" activity. However, current platform responses to activities like griefing are generally clumsy and put users at continued risk. For example, the most common method to mitigate this activity is to have the user file individual reports of incidents and follow-up on said reports, however this practice is extremely difficult to scale, making the incident reporting and follow-up a poor deterrent. Another response to this activity has been for developers to employ a "space bubble" that can be turned on or off by the user. When on, other users on the platform cannot cross the threshold created by the bubble into another user's personal space. While a step in the right direction, this method is difficult for users to implement themselves (as the bubble may prohibit the user from moving into proximity of a necessary element of the application/game) and remains a non-intuitive approach.

Accordingly, embodiments of the invention described herein provide technical solutions for using defined proxemics to manage interpersonal encounters between users in VR gaming environments. In an embodiment, a VR environment is initiated having a VR space in which a user, represented by an avatar, socializes amongst other users respectively represented as other avatars within the VR space. An impenetrable space barrier, having a size defined by predefined criteria, is created to enclose the avatar during movement within the VR space. The size of the impenetrable space barrier, with respect to an allowed interpersonal proximity between the avatar and each specific avatar of the other avatars, is dynamically adjusted during the movement within the VR space according to the predefined criteria and extrapolated data associated with the avatar and the other avatars.

In an embodiment, the impenetrable space barrier is spherical, having an initial circumference defined by the predefined criteria.

In an embodiment, an initial size of the impenetrable space barrier is defined by the predefined criteria according to extrapolated data from public spaces of physical world scenarios virtually represented in the VR space.

In an embodiment, the predefined criteria further comprises at least one of a number of meetings between the avatar and each specific avatar of the other avatars, and an amount of time the avatar spends with each specific avatar of the other avatars.

In an embodiment, the dynamically adjusting further comprises shrinking the size of the impenetrable space barrier of the avatar with respect to a first avatar of the other avatars while maintaining the initial size of the impenetrable space barrier of the avatar with respect to a second of the other avatars, according to the predefined criteria and the extrapolated data.

In an embodiment, the predefined criteria is contextually-based and dynamically changing with respect to at least one of a type of the VR space, pre-established relationships between the user and the other users, and feedback from the user and the other users.

In an embodiment, the impenetrable space barrier represents at least one of a plurality of proxemic zones being scenario-based or temporally-based.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Turning now to FIG. 1, computing environment 100 contains an example of an environment for the execution of at least some of the computer code involved in performing the inventive methods, such as proxemic management module 200. In addition to proxemic management module 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and peer-engagement operations module 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in peer-engagement operations module 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
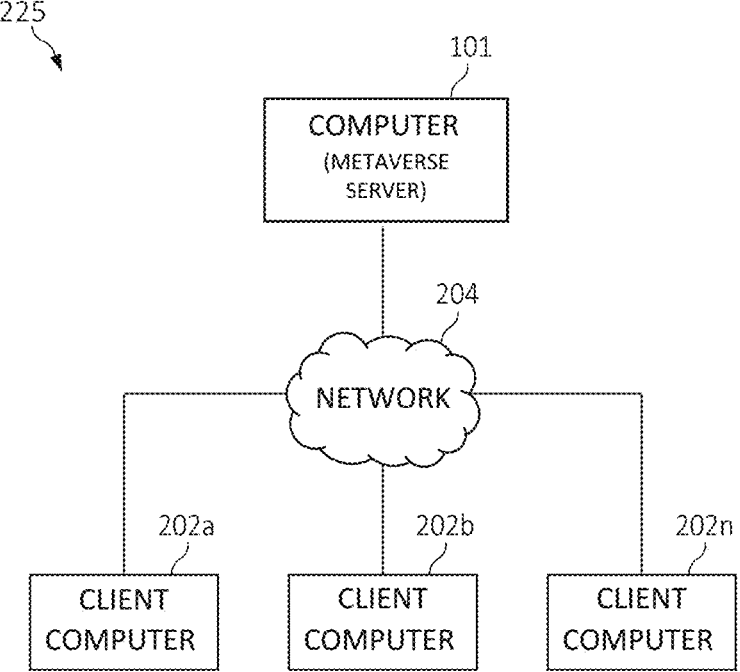
FIG. 2 is a block diagram depicting a computer network system, inclusive of the computing device, in which operations of the description may be performed.

FIG. 2 depicts a schematic diagram of one embodiment of a computer network system 225. The illustrated computer network system 225 includes client computers 202a, 202b, and 202n (collectively referred to herein as client computers 202a . . . *n*), computer 101 (operating, for example, as a metaverse server), and network 204. The computer network system 225 may interface a system user and computer 101 according to the interface operations of the client computers 202a . . . *n*. Although the depicted computer network system

225 is shown and described herein with certain components and functionality, other embodiments of the computer network system 225 may be implemented with fewer or more components or with less or more functionality. For example, some embodiments of the computer network system 225 include a plurality of computers 101 and a plurality of WANs 102. Additionally, some embodiments of the computer network system 225 include similar components arranged in another manner to provide similar functionality, in one or more aspects.

The client computers 202a . . . *n* may incorporate all of the resources of the computer 101 and operate as VR clients to manage the interface between a system user and the computer 101. In one aspect, each of the client computers 202a . . . *n* are associated with one user. In another aspect, one or more of the client computers 202a . . . *n* is associated with multiple users. In an embodiment, one or more of the client computers 202a . . . *n* are desktop computers or laptop computers. In an embodiment, one or more of the client computers 202a . . . *n* are mobile computing devices that allow the user to connect to and interact with a VR environment/space (e.g., The Metaverse). In an embodiment, one or more of the client computers 202a . . . *n* are video game consoles.

In an embodiment, the computer 101 hosts a simulated virtual world, space and/or environment accessed by each of the plurality of the client computers 202a . . . *n*, although the computer 101 may host the VR environment for only a single client (client computer 202a, for example). In one embodiment, the computer 101 is an array of servers. In one embodiment, a specified area of the VR environment is simulated by a single server instance, and multiple server instances may be run on a single computer 101. In some embodiments, the computer 101 includes a plurality of simulation servers dedicated to physics simulation in order to manage interactions between characters and objects in the VR environment. The computer 101 also may include a plurality of storage servers, apart from the plurality of simulation servers, dedicated to storing data related to objects and characters in the VR environment. The data stored on the plurality of storage servers may include object shapes, avatar shapes and appearances, audio clips, metaverse related scripts, and other VR environment-related objects. The plurality of storage servers may also store data associated with users and information regarding their interactions with other users in the VR environment.

In an embodiment, the network 204 may comprise a wide area network, such as WAN 102. In an embodiment, the network 204 may comprise a local area network (LAN). The network 204 may further communicate traditional block I/O, for example, over a storage area network (SAN). The network 204 may also communicate file I/O, for example, using a transmission control protocol/Internet protocol (TCP/IP) network or similar communication protocol.

It should be noted that, as used herein, the term "client" (and/or "host") means a processing device or system, such as a workstation, desktop computer, mobile computer, tablet computer, gaming console or the like that resides client-side in a client/server(s) relationship with the computer 101, and that the client and server(s) communicative with one another together are referred to herein as the "virtual system".

Referring now to FIG. 3, a schematic view of a VR space 300 of a VR platform is illustrated. The VR space 300 includes two VR scenes. Depicted in scene 310, a user 302 (represented in the VR space 300 as an avatar) socializes, works, and/or plays (e.g., a VR game) amongst other users 304a, 304b (represented in the VR space 300 as respective other avatars) in scene 310 of the VR platform. In scene 310, neither the user 302 nor the other users 304*a*, 304*b* have implemented any type of space barrier around them preventing other users (e.g., griefers) from entering their personal space.

Scene 320 of the VR space 300 illustrates an example of a griefer 306 (additionally represented by a respective avatar in the VR space 300) suddenly appearing amongst (i.e., in very close proximity to) the user 302 and the other users 304*a*, 304*b*. This sudden appearance of the griefer 306 generally (and with the intent to) prompts a physiological reaction (e.g., triggering of a fight-or-flight response) of the user 302 and/or the other users 304*a*, 304*b* in real-time. It should be noted that such a sudden stimulus caused by the griefer 306 can be particularly dangerous for users prone to and/or having existing physiological conditions, such as Post-Traumatic Stress Disorder (PTSD), epilepsy, certain heart conditions, etc. As previously mentioned, griefers such as griefer 306 often repeatedly suddenly appear and/or continuously block, impede, or otherwise frustrate the users they attack in an attempt to obtain an adverse reaction from their victim or otherwise stagnate their victim's experience within the VR space 300.

To combat this practice, the present invention draws from the work of proxemics founder, Anthropologist Edward Hall, to propose an impenetrable space barrier (also referred to herein simply as "space barrier") be created to enclose the user 302 as the user moves about the VR space 300. Specifically, a space barrier is created around the user 302 (i.e., the avatar representing the user 302) of which the dimensions thereof are dynamically adjusted for interpersonal encounters between the user 302 and the other users 304*a*, 304*b*. Particularly, the current dimensions of the space barrier at any point in time are based on a strength of relationship between the user 302 and each respective other user 304*a*, 304*b* as a function of context and time (e.g., an amount of time the relationship has existed). In an embodiment, this space barrier enclosing the user 302 is spherical in shape having a radius of the sphere forming the dynamically adjusted dimension. In an embodiment, and pursuant to the type of VR space 300 the user 302 is located in, the space barrier may consist of other three-dimensional shapes (e.g., cube, rectangular prism, cone, cylinder, etc.) and/or two-dimensional shapes (e.g., circle, oval, octagon, square, etc.) depending on which shape lends itself to the environment of the VR space 300 at hand.

Figure 4:
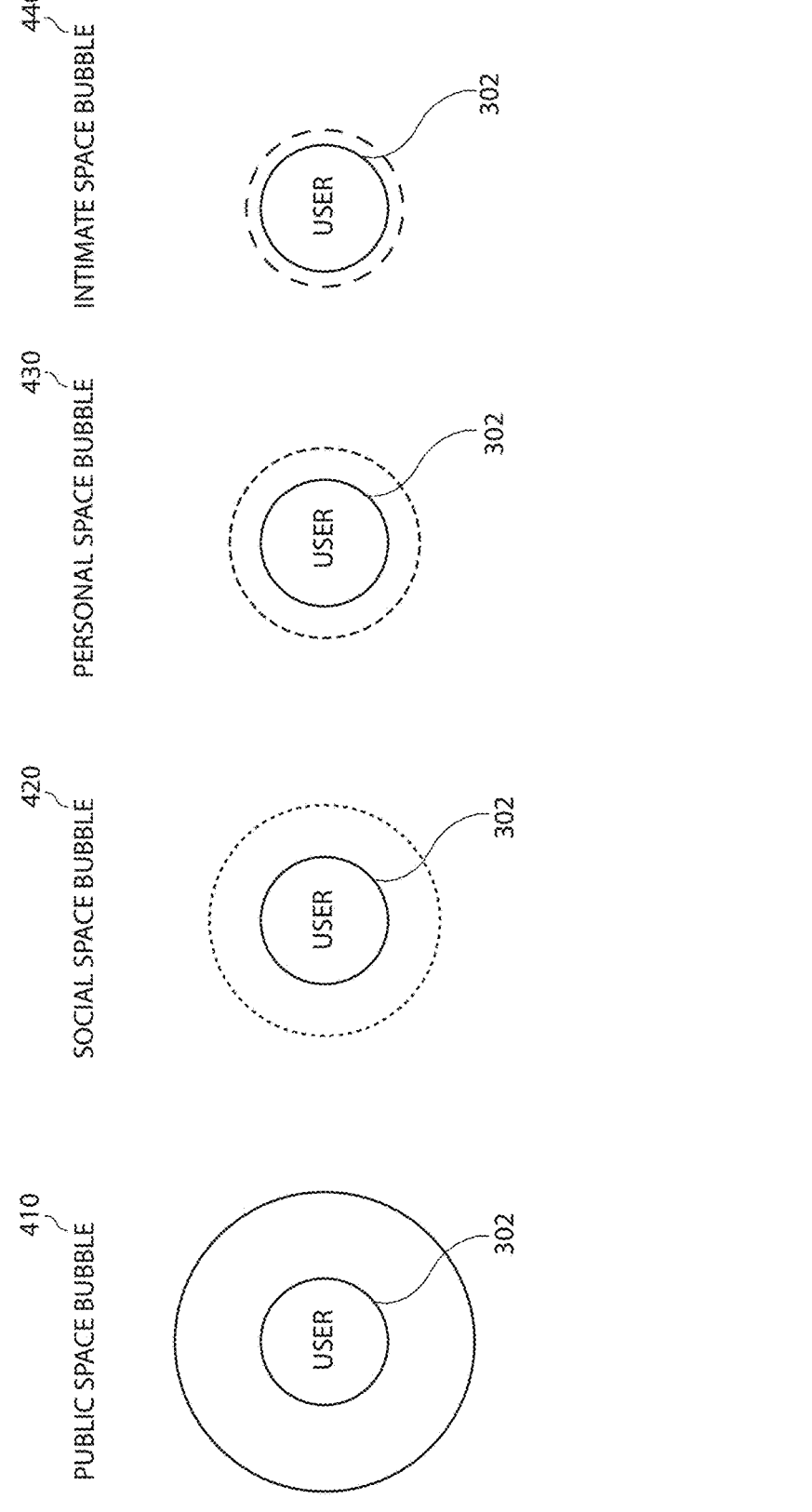
FIG. 4 is a schematic view of proxemic zones defining interpersonal space around users.

Turning now to FIG. 4, an overview of proxemic zones 400 are illustrated drawing on the aforementioned proxemic work of Edward Hall. Proxemics, as proposed by Hall, is directed to the study of use of space humans feel it necessary to set between themselves and others. Specifically, as illustrated in FIG. 4, Hall proposed that (generally) humans create interpersonal distances between one another in four distinct zones. In a public space bubble/zone 410, it is considered that individuals generally allow for an average of 7.6 meters of space between themselves and others in places where generally the individuals within the space are unknown to one another and/or are in a public setting. In a social space bubble/zone (social space bubble 420), it is considered that individuals generally allow for an average of 3.6 meters of space between themselves and others in places where generally the individuals within the space are interacting among acquaintances. In a personal space bubble/zone (social space bubble 430), it is considered that individuals generally allow for an average of 1.2 meters of space between themselves and others in places where generally the individuals within the space are interacting among friends/ family and/or well-known individuals. In an intimate space bubble/zone (social space bubble 440), it is considered that individuals generally allow for an average of 0.45 meters of space between themselves and others for embracement, touching, or whispering.

Referring now to FIG. 5, a schematic view of a VR space 500 of a VR platform is illustrated. The VR space 500 includes two VR scenes. Under implementation of the present invention, the user 302 in scene 510, having activated the space barrier to enclose the user 302 within the VR space 500, is interacting with two other users 304*a*, 304*b* on the platform in which all of the users 302, 304*a*, and 304*b* are acquaintances. Each of the users 302, 304*a*, and 304*b* in scene 510 have a space barrier defined as a size relative to the social space/bubble 420 zone (as each of the users are familiar with one another), allowing the users to enter within a defined proximity to one another, as set within the VR system/platform preferences/settings.

In scene 510, the griefer 306 appears suddenly among the users 302, 304*a*, and 304*b* in attempt to antagonize one or more of them. However, the griefer 306 in scene 510 is unable move close enough to any of the users 302, 304*a*, and 304*b* to trigger a "jump scare" of any one of them due to their space barriers each having the size relative to the public space bubble/zone 410. This disallows the griefer 306 to enter within a proximity any closer to the users than would be appropriate in the physical world relative to the public space bubble/zone 410, as the VR system recognizes that griefer 306 is unknown to any of the users 302, 304*a*, and 304*b*.

FIG. 6 illustrates an additional schematic view of a process 600 for dynamic implementation of the space barrier with respect to user-relationships, time, and context in VR applications. Process 600 illustrates that, in an initial meeting of user 302 and user 304*a* in a VR space, for example, a predefined VR platform-specific range may be parameterized to enclose each of the users 302 and 304*a* in a space barrier set at a 'public' setting, having a size (e.g., circumference) relative to the public space bubble/zone 410 representative of public settings in the physical world (e.g., according to a user and/or platform-defined familiarity value range set at 0-3). It should be noted that process 600 depicts a numerical value familiarity setting utilized by the VR system, however it should be noted that any values and/or ranges of values may be used as familiarity parameters (e.g., alphanumerical terms (low, medium, high), etc.)

Process 600 continues to illustrate that, as the user 302 and user 304*a* meet subsequently in the VR space and/or spend an amount of time with one another, the VR platform-specific range may parameterize and dynamically adjust (i.e., reduce) the sizing (e.g., the circumference) of the space barrier of user 302 and/or 304*a* to a 'social' setting based on the social space/bubble 420, representative of social settings of acquaintances in the physical world (e.g., according to the user and/or platform-defined familiarity value range set at 3-9). To wit, the VR system may extrapolate that user 302 and user 304*a* have become acquaintances according to a number of interactions and/or a time of interactive activity between the two.

As the user 302 and user 304*a* continue to grow in familiarity by meeting subsequently in the VR space and/or spending additional time with one another, the VR platform-specific range may again dynamically adjust the sizing of the space barrier enclosing user 302 and/or 304*a* (with specific respect to one another) to a 'personal' setting of the personal space bubble/zone 430, representative of meetings of closely-known individuals in the physical world (e.g., according to the user and/or platform-defined familiarity value range set at 10). Here again, the VR system may extrapolate that user 302 and user 304*a* have created a stronger relationship according to the number of interactions and/or the time of interactive activity between the two.

Finally, as the user 302 and user 304*a* meet more often in the VR space and/or spend even more time with one another, the VR platform-specific range may dynamically adjust the sizing of the space barrier enclosing user 302 and/or 304*a* to an 'intimate' setting of the intimate space bubble/zone 440, representative of settings of closely-known individuals (e.g., whispering/touching) in the physical world (e.g., according to the user and/or platform-defined familiarity value range set at 50). The VR system may continue its data extrapolation with respect to user 302 and user 304*a* (and with respect to each other user in the VR space the user 302 encounters) to continue to ascertain dynamic changes to the space barrier preferable by the user 302 according to familiarity and context.

It should be noted that each of the elements associated with the space barrier and the space/bubbles 410-440 may be user and/or VR platform-defined. For example, VR platforms may predefine different proxemic levels and the familiarity value parameters assigned thereto for all users on the platform. In another example, users may be enabled to assign the proxemic levels and/or the familiarity value parameters assigned thereto for their own use. Further, the sizing of the space barrier may not only be reduced according to familiarity among specific users, but rather also increased based on extrapolated data and predefined criteria (e.g., the size of the space barrier enclosing user 302 with respect to user 304*a* may increase in size perhaps subsequent to a predefined amount of time passing with no interactions/meetings between the two users).

Additionally, the examples provided herein are relative to a North American context. The context of the setting (e.g., work vs. game/entertainment) of the VR space, the number of meetings and/or the amount of time necessary to advance to more personal proxemic zone in the form of a dynamic-adjustment of a reduction in size of the space barrier of the user(s) (i.e., allowing other users to move closer to the user(s)) may be geographically and platform-specific. For instance, in some geographical regions in the world, it may be more culturally appropriate to slow the rate of decrease in size of the space barrier surrounding the user than would be acceptable in other geographical regions.

Further, contextual factors may be considered such as the type of VR space and type of activities performed in the VR space. For example, while a dynamic-adjustment of the space barrier to reduce the amount of space between users pursuant to their relationship may be acceptable or warranted in a gaming or entertainment type of VR space, the same may not be true of a VR space in which users perform workplace functions (e.g., where a public space bubble/zone 410 is maintained between all users).

It should further be noted that administrating bodies of the VR platforms must determine policy for situations when users with differing-levels of space barriers encounter each other in the VR space. For example, in a situation where user 302 has an initial meeting familiarity parameter set to initially size their space barrier at the personal space/bubble 420 level, and user 304*a* has an initial familiarity parameter set to initially size their space barrier at the public space/bubble 410 level, the administrator must set policy which settles this conflict.

A recommended policy may comprise that a principle of most user-comfort is adhered to (i.e., defaulting to the largest-sized space barrier preferred by any users party to the interaction). An additional policy is to represent the dimension of the user 302's space barrier as X, the dimension of the user 304*a*'s space barrier as Y, and the total space maintained between the user 302 and 304*a* as Z (X+Y=Z). In this model, the user 302 is guaranteed a level of personal space according to their predefined preferences (which may be larger or smaller in size dependent on the preference of the user 304*a*), yet does not breach the baseline level of comfort preferred by each user.

Figure 7:
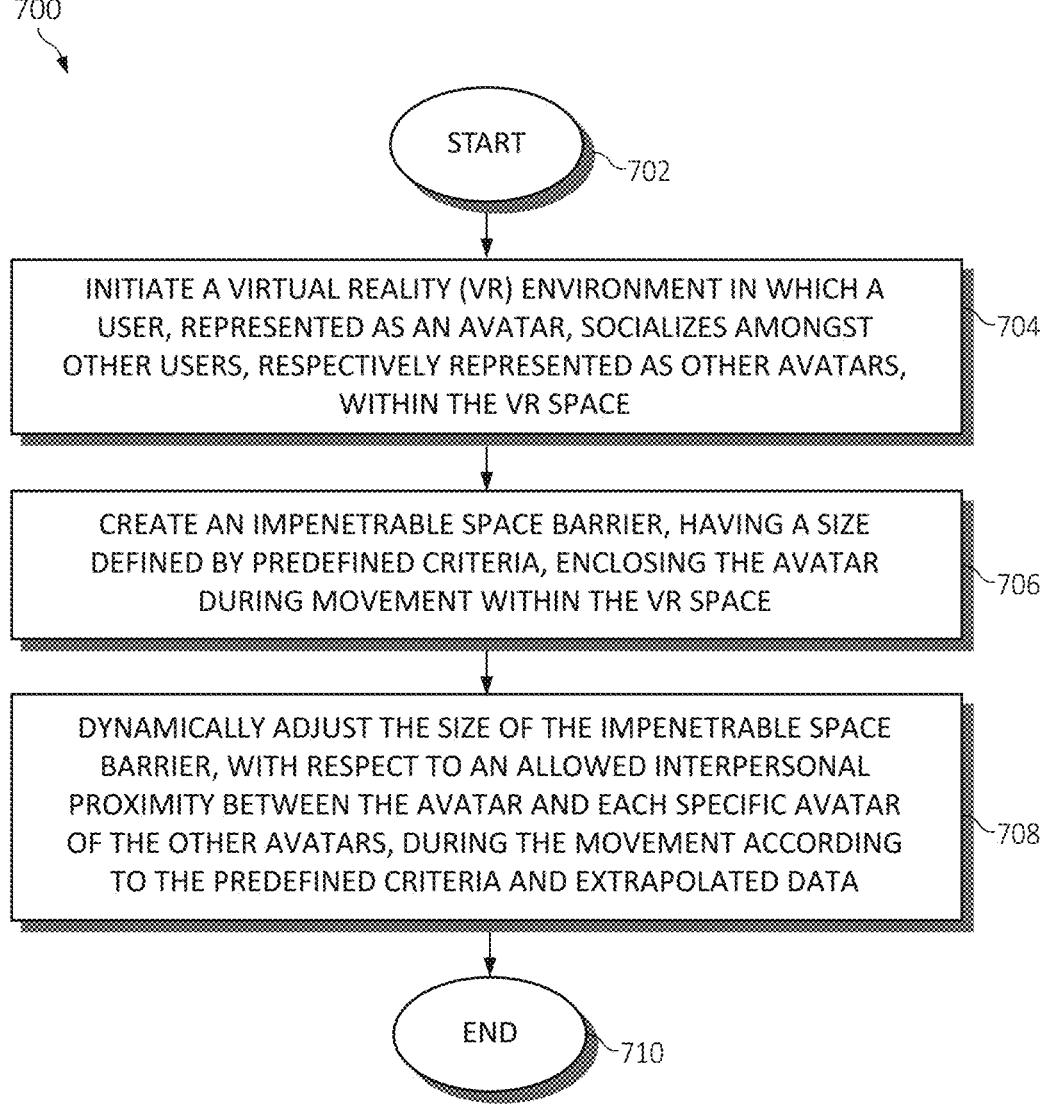
FIG. 7 is a flow diagram depicting a computer-implemented method for using defined proxemics to manage interpersonal encounters between users in VR environments.

FIG. 7 provides an overview of the process to use defined proxemics for managing interpersonal encounters in VR environments, depicted as a computer-implemented method 700. It should be understood that the operations of the computer-implemented method 700 may be performed by the processor set 110 of the computer 101 depicted in the computing environment 100 of FIG. 1 by executing computer code of the peer-engagement operations module 200, commensurate with the description of such in FIGS. 1 and 2.

The computer-implemented method 700 starts (step 702), with initiating, by one or more processors, a VR environment having a VR space in which a user, represented by an avatar, socializes amongst other users respectively represented as other avatars within the VR space (step 704). The computer-implemented method 700 continues by creating, by the one or more processors, an impenetrable space barrier, having a size defined by predefined criteria, enclosing the avatar during movement within the VR space (step 706). The computer-implemented method 700 further continues by dynamically adjusting, by the one or more processors, the size of the impenetrable space barrier, with respect to an allowed interpersonal proximity between the avatar and each specific avatar of the other avatars, during the movement within the VR space according to the predefined criteria and extrapolated data associated with the avatar and the other avatars (step 708). The computer-implemented method 700 ends at step 710.

It should be noted that, in some embodiments, the methods and/or systems described herein may utilize a "cognitive analysis," "cognitive system," "machine learning," "artificial intelligence (AI)," "cognitive modeling," "predictive analytics," and/or "data analytics," as is commonly understood by one skilled in the art.

Generally, these processes may include, for example, executing machine learning logic or program code to receive and/or retrieve multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the generation of user experience models, as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or developers may also be utilized, which may allow for the performance of the system to further improve with continued use.

In certain embodiments, the cognitive analyses described herein may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include averaged one-dependence estimators (AODE), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, distributed autonomous entity systems based interaction (IBSEAD), association rule learning, apriori algorithm, Equivalence Class Clustering and bottom-up Lattice Traversal (ECLAT) algorithm, Frequent Pattern (FP)-growth algorithm, hierarchical clustering, single-linkage clustering, conceptual clustering, partitional clustering, k-means algorithm, fuzzy clustering, and reinforcement learning. Some non-limiting examples of temporal difference learning may include Quality (Q)-learning and learning automata. Specific details regarding any of the examples of supervised, unsupervised, temporal difference or other machine learning described in this paragraph are known and are considered to be within the scope of this disclosure.

For example, machine learning and/or AI may be utilized to identify behavior of the user and/or the other users associated with the avatars 302a . . . n. In some implementations, the virtual system may, over time, learn which of the other users 304a . . . the user 302 desires to allow in closer proximity than others. The virtual system may identify trends and/or patterns associated with the user 302 and the other users 304a . . . in order to determine the context in which the user 302 meets and interacts with other users 304 . . . in the VR space. For instance, the virtual system may generate a model(s) to determine specific times of day, times of week/year, specific types of VR spaces (e.g., work applications, game applications, social applications), physical locations the user accesses the virtual system (e.g., home or office), and like data to allow the system to gain an understanding of the user's preferences. These preferences may then be utilized to dynamically adjust the proxemic zones of the barrier enclosing the user automatically and/or with user feedback.

It should be noted that, as used herein, the terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for using defined proxemics to manage interpersonal encounters between users in virtual reality (VR) environments, the computer-implemented method comprising:

initiating, by one or more processors, a VR environment having a VR space in which a user, represented by an avatar, socializes amongst other users respectively represented as other avatars within the VR space;

creating, by the one or more processors, an impenetrable space barrier, having a size defined by predefined criteria, enclosing the avatar during movement within the VR space;

dynamically adjusting, by the one or more processors, the size of the impenetrable space barrier, with respect to an allowed interpersonal proximity between the avatar and each specific avatar of the other avatars, during the movement within the VR space according to the predefined criteria and extrapolated data associated with the avatar and the other avatars;

preventing any other griefer users to enter said impenetrable space no matter any data content or any amount of time the avatar spends with each specific avatar; and dynamically adjusting further comprises shrinking the size of the impenetrable space barrier of the avatar with respect to a first avatar of the other avatars while maintaining an initial size of the impenetrable space barrier of the avatar with respect to a second of the other avatars, according to the predefined criteria and the extrapolated data.

2. The computer-implemented method of claim 1, wherein the impenetrable space barrier is spherical, having an initial circumference defined by the predefined criteria.

3. The computer-implemented method of claim 1, wherein an initial size of the impenetrable space barrier is defined by the predefined criteria according to extrapolated data from public spaces of physical world scenarios virtually represented in the VR space.

4. The computer-implemented method of claim 1, wherein the predefined criteria further comprises at least one of a number of meetings between the avatar and each specific avatar of the other avatars, and an amount of time the avatar spends with each specific avatar of the other avatars.

5. The computer-implemented method of claim 1, wherein the predefined criteria is contextually-based and dynamically changing with respect to at least one of a type of the VR space, pre-established relationships between the user and the other users, and feedback from the user and the other users.

6. The computer-implemented method of claim 1, wherein the impenetrable space barrier represents at least one of a plurality of proxemic zones being scenario-based or temporally-based.

7. A system for using defined proxemics to manage interpersonal encounters between users in virtual reality (VR) environments, comprising:

one or more processors; and one or more memory storing instructions executed by the one or more processors, the executed instructions causing the one or more processors to:

initiate a VR environment having a VR space in which a user, represented by an avatar, socializes amongst other users respectively represented as other avatars within the VR space; create an impenetrable space barrier, having a size defined by predefined criteria, enclosing the avatar during movement within the VR space; and dynamically adjust the size of the impenetrable space barrier, with respect to an allowed interpersonal proximity between the avatar and each specific avatar of the other avatars, during the movement within the VR space according to the predefined criteria and extrapolated data associated with the avatar and the other avatars;

preventing any other griefer users to enter said impenetrable space no matter any data content or any amount of time the avatar spends with each specific avatar; and and dynamically adjusting further comprises shrinking the size of the impenetrable space barrier of the avatar with respect to a first avatar of the other avatars while maintaining an initial size of the impenetrable space barrier of the avatar with respect to a second of the other avatars, according to the predefined criteria and the extrapolated data.

8. The system of claim 7, wherein the impenetrable space barrier is spherical, having an initial circumference defined by the predefined criteria.

9. The system of claim 7, wherein an initial size of the impenetrable space barrier is defined by the predefined criteria according to extrapolated data from public spaces of physical world scenarios virtually represented in the VR space.

10. The system of claim 7, wherein the predefined criteria further comprises at least one of a number of meetings between the avatar and each specific avatar of the other avatars, and an amount of time the avatar spends with each specific avatar of the other avatars.

11. The system of claim 7, wherein the predefined criteria is contextually-based and dynamically changing with respect to at least one of a type of the VR space, pre-established relationships between the user and the other users, and feedback from the user and the other users.

12. The system of claim 7, wherein the impenetrable space barrier represents at least one of a plurality of proxemic zones being scenario-based or temporally-based.

13. A computer program product for using defined proxemics to manage interpersonal encounters between users in virtual reality (VR) environments, the computer program product comprising:

one or more non-transitory computer readable storage media, and program instructions collectively stored on the one or more non-transitory computer readable storage media, the program instructions comprising:

program instructions to initiate, by one or more processors, a VR environment having a VR space in which a user, represented by an avatar, socializes amongst other users respectively represented as other avatars within the VR space;

program instructions to create, by the one or more processors, an impenetrable space barrier, having a size defined by predefined criteria, enclosing the avatar during movement within the VR space; and program instructions to dynamically adjust, by the one or more processors, the size of the impenetrable space barrier, with respect to an allowed interpersonal proximity between the avatar and each specific avatar of the other avatars, during the movement within the VR space according to the predefined criteria and extrapolated data associated with the avatar and the other avatars;

program instructions to prevent any other griefer users to enter said impenetrable space no matter any data content or any amount of time the avatar spends with each specific avatar; and and program instructions to dynamically adjust further comprises shrinking the size of the impenetrable space barrier of the avatar with respect to a first avatar of the other avatars while maintaining an initial size of the impenetrable space barrier of the avatar with respect to a second of the other avatars, according to the predefined criteria and the extrapolated data.

14. The computer program product of claim 13, wherein:

the impenetrable space barrier is spherical, having an initial circumference defined by the predefined criteria; and an initial size of the impenetrable space barrier is defined by the predefined criteria according to extrapolated data from public spaces of physical world scenarios virtually represented in the VR space.

15. The computer program product of claim 13, wherein the predefined criteria further comprises at least one of a number of meetings between the avatar and each specific avatar of the other avatars, and an amount of time the avatar spends with each specific avatar of the other avatars.

16. The computer program product of claim 13, wherein the predefined criteria is contextually-based and dynamically changing with respect to at least one of a type of the VR space, pre-established relationships between the user and the other users, and feedback from the user and the other users.

17. The computer program product of claim 13, wherein the impenetrable space barrier represents at least one of a plurality of proxemic zones being scenario-based or temporally-based.

* * * * *